May 24, 1932.  J. B. BOWERMAN  1,860,227
SYSTEM FOR RECORDING
Filed March 9, 1931
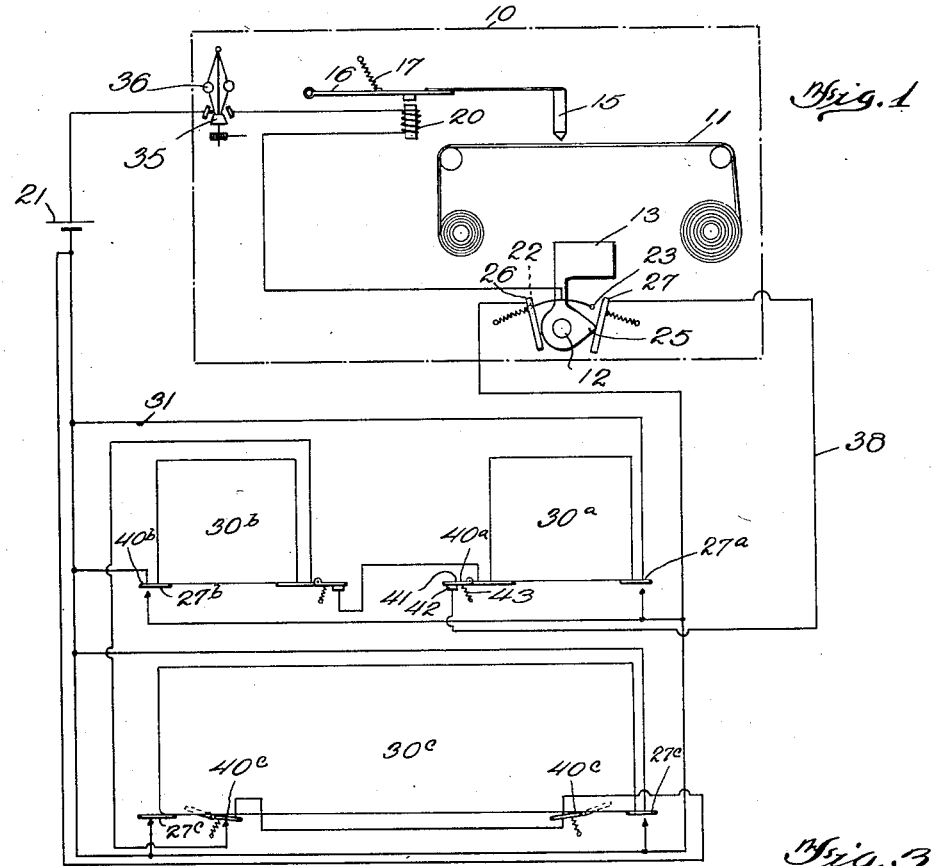
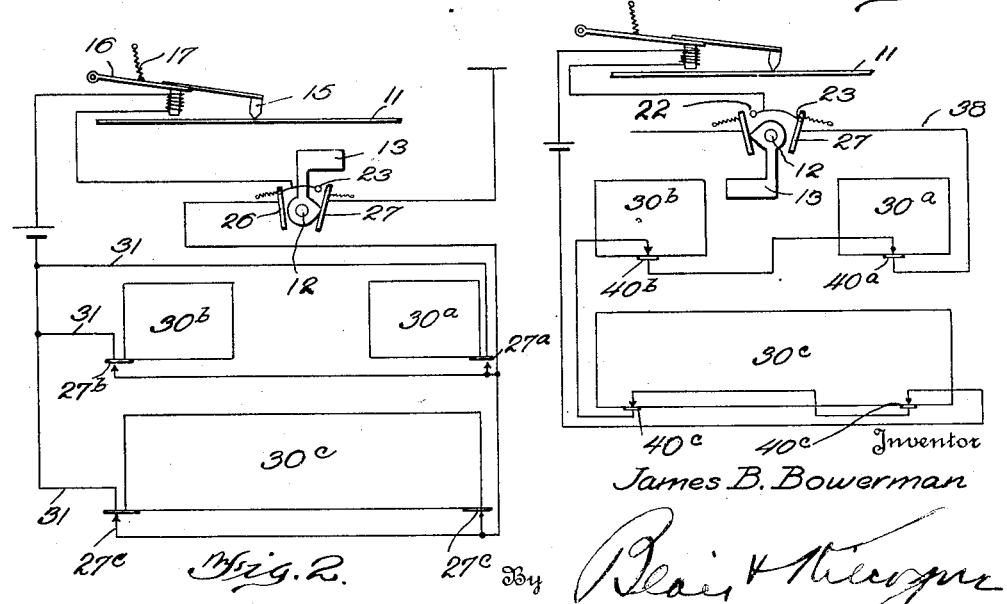
Inventor
James B. Bowerman Patented May 24, 1932

1,860,227

UNITED STATES PATENT OFFICE

JAMES B. BOWERMAN, OF BALTIMORE, MARYLAND

SYSTEM FOR RECORDING

Application filed March 9, 1931. Serial No. 521,355.

This invention relates to improvements in recording systems and more particularly to systems for recording the number of fares carried by a taxicab or like conveyance for hire during such times as the meter flag is by reason of carelessness or dishonesty on the part of the cab driver in improper position.

While taximeters of a type in common use are provided with means such as a detective tape and mechanism associated therewith for recording on the tape the number of times the flag has been operated, whereby the fares turned in by the driver may be checked against the number of times the meter flag has been pulled, there have heretofore been in use no systems for recording the number of fares carried in relation to the position of the meter flag. Consequently, a cab driver, either through dishonesty or carelessness, may leave his flag in improper position such as in "up" or "for hire" position when carrying a fare and make no accounting therefor, and the cab owner or checker is without means of checking such a driver. Again, with the advent of the flat zone rate system, it is sometimes inadvisable or unnecessary to pull the meter flag in "in use" position when a fare is carried, and a dishonest driver may fail to make an accounting of such a fare. Again, with the flat zone rate systems where the owner company instructs the driver to pull the flag for every fare, thus to check as far as possible his accountings against the meter record, a driver may take on a short run fare which does not exceed the zone mileage permitted and, instead of cutting off the meter at the end of the run, may thereafter obtain another fare and pocket the difference between the amounts charged the two fares and the amount which, according to the meter, he must account for.

Accordingly, an object of my invention is the provision of a system of recording for use with taxicabs for hire, by the use of which the occurrence and number of fares carried by a cab is recorded in such a manner that attempts at dishonesty on the part of the cab driver may be readily ascertained and checked. A further object is the provision of a system for recording the presence and/or absence of fares when the taximeter flag is in improper position, thus to record whether or not the flag was properly pulled by the cab driver and the distance traveled with the fare, if and when carried, whereby such record may be checked against the driver's accounting or manifest. A further object is the provision of an electrical system for recording whether or not fares are carried by a cab during certain positions of the meter flag as read on a traveling tape which may form a part of the conventional meter record, or which may be separately installed in a meter or otherwise for the purpose of making the record as proposed by me.

Other objects will be in part obvious and in part hereinafter pointed out in connection with the accompanying sheet of drawings illustrating an embodiment of my invention.

In the drawings—

Fig. 1 is a diagrammatic illustration of my improved system of recording as applied to a conveyance for hire, such as a taxicab, and its associated meter mechanism;

Fig. 2 is a diagrammatic illustration of the circuit giving a "fare carrying" record;

Fig. 3 is a diagrammatic illustration of the circuit giving a "no-fare carrying" record.

In brief explanation of the application of my system to the recording systems commonly used with taximeters, one type of taximeter in common use incorporates a recording means under the control of the meter flag whereby, when the meter flag is pulled to a proper "in use" position, a record is made on the detective tape forming a part of such recording means. Such existing or conventional recording means, forming no part of my present invention, will not be hereinafter described except in so far as it enters into the general combination, resulting upon the incorporation of my additional and improved system of recording therewith.

In the following analysis of my improved system as applied to such existing forms of taximeter recording, it is further to be noted that no record is made when the taximeter flag is in proper position during "fare" or "no fare" carrying position, as such a record, as hereinbefore stated, is made with the usual taximeter record. In other words, while my improved system makes record when the flag is in improper position, either during the interval of carrying a fare in the vehicle, by a circuit giving a record which is hereinafter called a "fare carrying record", or in the absence of a fare by a circuit giving a record which is hereinafter called a "no-fare carrying" record, my system gives no record of fares carried with the flag in "in use" position, nor of the absence of fares carried when the flag is in "up" or "for hire" position. It is to be understood, however, as will be hereinafter set forth, that although my invention is intended for use in conjunction with a detective tape of the character stated, the invention is not so limited by me, and comprehends also the installation in a meter having no such traveling tape recording mechanisms, of a traveling tape for the purpose of recording the markings of my system of recording.

Referring now to the drawings, the reference character 10 designates generally a conventional taximeter having incorporated therewith a tape 11 which is kept in continuous motion as by means of a clock train or equivalent motor (not shown) and on which may or may not, depending on the type of meter used, be recorded the position of the meter flag (whether in "for hire" or in "in use" position), whether the cab is in motion or is standing still, and, if moving, the distance travelled. Where the conventional record is made, such is under the control of a meter flag shaft 12 carrying the flag 13 movable to and from "for hire" and "in use" position. As a supplement to the means for making a record on the tape 11 as mentioned, I provide a further recording means including a stylus 15 carried by a pivoted relay arm 16. By means of a spring or equivalent means 17 urging the relay arm 16 relatively upwardly, the stylus 15 is maintained raised or in non-recording position except during such times as the relay arm 16 is actuated downwardly.

The relay arm 16 is under the control of a solenoid, generally designated at 20, in circuit with a battery 21 and with branch switch terminals 22, 23 preferably disposed adjacent the meter flag shaft 12, the meter flag adjacent its shaft 12 carrying a cam nose 25 operative to engage adjacent switch arms 26, 27 adjacent the switch terminals 22, 23, respectively. By reference to Fig. 2, the terminal 22 and switch arm 26 are in a circuit giving the "fare carrying" record, above mentioned, said circuit including a plurality of switches 27a, 27b and 27c under control of the vehicle seats 30a, 30b and 30c, said switches being connected by leads 31 to battery 21.

The switches 27a, 27b and 27c are preferably weight controlled and may be of any desired construction and are so associated with the vehicle seats that they are operative to close when a passenger sits on any of the seats, to thus complete a circuit through battery 21, solenoid 20, when and if the switch terminal 22 under the control of the meter flag is in contact with switch arm 26.

Considering now the operation of such a circuit giving a "fare carrying record", the meter flag 13 in its "up" or "for hire" position (see Fig. 1) causes the switch arm 26 to assume a normal position in engagement with the branch terminal 22, as will be readily understood. Consequently with the meter flag in "up" position and with no fares carried in the cab, no record is made on the detective tape 11, as switches 27a, 27b and 27c under the control of the weight of passengers sitting on seats 30a, 30b and 30c are in separated or circuit breaking relation. If, however, a fare is carried on any one of the seats 30a, 30b, 30c, with the flag in such "up" or "for hire" position (which is an improper position when a fare is being carried), one of the seat controlled switches 27a, 27b, 27c, is closed to close a circuit through battery 21 and solenoid 20, and the relay arm 16 is thereupon actuated to bring the stylus 15 into record making relation with the detective tape 11. During the interval that the cab is moving with the fare carried and with the meter flag 13 in "up" or improper position, such marking or record is made on the tape and can be easily read by a tape checker.

In order to make such circuit operative only during the times that the cab is in motion, I may insert in the circuit a governor controlled switch, as at 35, the governor being connected up with any of the moving parts of the taximeter or speedometer whereby as the vehicle is in motion, the governor 36 operates to close its associated switch 35 to close the circuit, and whereby as the vehicle is stopped the circuit is opened.

Considering now the circuit giving the "no fare carrying" record when the meter flag is in improper position, which circuit is connected in parallel across the circuit giving the "fare carrying" record, such circuit under consideration includes the switch terminal 23, switch arm 27, to which latter is connected a lead 38 having arranged therein in series a plurality of switches 40a, 40b, 40c, each associated with one of the vehicle seats 30a, 30b, 30c, and so arranged as to be in closed or circuit making relation in the absence of weight such as the weight of a fare on such seats. Such switches may be of any desired construction and are illustratively shown in Fig. 1 to comprise a pivoted switch lever 41, one leg of which is in movable engagement with one of the seats, and the other leg being operatively relates to a switch terminal 42 and normally in engagement therewith through medium of spring 43. When weight, such as the weight of a fare being carried, is disposed on any of the seats, the switch lever 41 is actuated away from the terminal 42 to thus break the circuit. By reference to Figs. 1 and 3, the said switches 40a, 40b, 40c, are connected in series in the no fare carrying circuit. Consequently, as a fare is seated on any one of the vehicle seats, the circuit through battery 21, solenoid 20, switch terminal 23, and switch arm 27 (when the latter terminal and arm are in closed or circuit making relation) is broken.

The operation of this latter circuit giving a "no-fare carrying" record is as follows. In the "up" position of the flag 13, contact between branch terminal 23 and its associated switch arm 27 is broken, and consequently the stylus 15 is maintained out of recording engagement with the detective tape 11. If the flag 13 is actuated to a down or "in use" position (see Fig. 3), the switch arm 27 thereupon engages the switch terminal 23. If, however, a fare is being carried, any one of the switches 40a, 40b, 40c, is actuated to circuit breaking position, and the stylus 15 is still maintained in its non-record making relation to the detective tape 11. However, if the flag 13 is down and no passengers are carried, the circuit is completed through switch terminal 23 and switch arm 27 and through all of the switches 40a, 40b, 40c, to energize solenoid 20, and thus attract the relay arm 16 to bring the stylus 15 into record making position with relation to the detective tape 11. Consequently, a record is made when the meter flag 13 is in "in use" position with no fares being carried in the vehicle.

Upon removal of the detective tape from the meter, a checker may look over these tapes and, in a very short time, set aside any that show stylus marks. By comparing such record with the marks that show whether the flag was pulled or not, the distance traveled, and with the driver's accounting or manifest to see if the job was turned in as a flat rate, the checker can readily ascertain whether any fares have been appropriated and if so the amount of the same.

As hereinbefore stated, my system of recording may be utilized with meters now in use having incorporated therewith the traveling detective tape as described. Where meters are not so equipped, a traveling tape and stylus may be readily installed therein with facility and my improved system may be utilized with equal effectiveness.

Without further analysis, the foregoing will so fully reveal the gist of this invention that others can by applying current knowledge readily adapt it for various applications without omitting certain features that from the standpoint of the prior art fairly constitute essential characteristics of the generic or specific aspects of this invention, and therefore such adaptations should and are intended to be comprehended within the meaning and range of equivalency of the following claims.

I claim:

1. In a taximeter having a traveling tape and a movable arm, the combination of a stylus operatively related to said tape, and electrical means operative to bring the stylus into record making relation with said tape, and including an electrical circuit having arranged therein a circuit opening means responsive for actuation to the weight of a fare and a circuit controlling means operatively related to said movable arm.

2. In a taximeter having a traveling tape and a movable arm, the combination of a stylus operatively related to said tape, and electrical means operative to bring the stylus into record making relation with said tape and including an electrical circuit having arranged therein a source of electrical energy, a solenoid operatively related to said stylus, a switch normally closing the circuit and responsive to the weight of a fare to open the same, and switch means for controlling said circuit, said switch means being responsive to movement of said movable arm.

3. In a taximeter having a traveling tape and a movable arm, the combination of a stylus operatively related to said tape, and electrical means operative to bring the stylus into record making relation with said tape, said means comprising electrical circuits, one of said circuits having connected therein a weight controlled switch normally closing the circuit, and another circuit having connected therein a weight controlled switch normally opening said circuit, one of said circuits being connected in parallel across another circuit, and both of said circuits having control means therein responsive to movement of said movable arm.

4. In a taximeter having a traveling tape and a movable arm, the combination of a stylus operatively related to said tape, and electrical means operative to bring the stylus into record making relation with said tape, said means comprising electrical circuits, each including a weight controlled switch, one of said circuits being connected in parallel across another circuit, said circuits having control means therein responsive to the position of said movable arm, said control means of one circuit operative to close said circuit when the movable member is in a proper position, and the control means of the other circuit being operative to close said other circuit when the movable member is in another proper position.

5. In a taximeter having a traveling tape and a movable arm, the combination of a stylus operatively related to said tape, and electrical means operative to bring the stylus into record making relation with said tape, said means comprising electrical circuits and a weight controlled switch in one of said circuits which is in circuit opening relation in the absence of weight, and a weight controlled switch in another circuit which is in circuit closing relation in the absence of weight, said circuits having control means therein responsive to the position of said movable arm.

6. In a taximeter having a traveling tape and a movable arm, the combination of a stylus operatively related to said tape, and electrical means operative to bring the stylus into record making relation with said tape, said means comprising electrical circuits, seat control switches connected in parallel in one of said circuits, said switches being in circuit opening relation in the absence of weight on the seat, and seat control switches connected in series in the other of said circuits in circuit closing position in the absence of weight on said seats, said circuits having control means therein responsive to the movement of said movable arm.

Signed at Baltimore, Maryland, this 27th day of February, 1931.

JAMES B. BOWERMAN.